US012547092B2

(12) United States Patent
Ikeda et al.

(10) Patent No.: US 12,547,092 B2
(45) Date of Patent: Feb. 10, 2026

(54) IMAGE-FORMING ROLLER, CHARGE ROLLER, METHOD FOR INSPECTING IMAGE-FORMING ROLLER, AND METHOD FOR INSPECTING CHARGE ROLLER

(71) Applicant: SYNZTEC CO., LTD., Tokyo (JP)

(72) Inventors: Atsushi Ikeda, Kanagawa (JP); Kenji Sasaki, Kanagawa (JP); Nozomu Suzuki, Kanagawa (JP); Satoshi Fukuoka, Kanagawa (JP); Kosuke Oura, Kanagawa (JP); Goki Inukai, Kanagawa (JP); Shogo Suzuki, Kanagawa (JP)

(73) Assignee: SYNZTEC CO., LTD. (JP)

( * ) Notice: Subject to any disclaimer, the term of this patent is extended or adjusted under 35 U.S.C. 154(b) by 59 days.

(21) Appl. No.: 18/294,100

(22) PCT Filed: Jun. 15, 2022

(86) PCT No.: PCT/JP2022/023970

§ 371 (c)(1),
(2) Date: Jan. 31, 2024

(87) PCT Pub. No.: WO2023/021827

PCT Pub. Date: Feb. 23, 2023

(65) Prior Publication Data

US 2024/0337963 A1 Oct. 10, 2024

(30) Foreign Application Priority Data

Aug. 17, 2021 (JP) ................................ 2021-132842

(51) Int. Cl.
*G03G 15/02* (2006.01)
*G03G 15/08* (2006.01)

(52) U.S. Cl.
CPC ..... *G03G 15/0233* (2013.01); *G03G 15/0818* (2013.01)

(58) Field of Classification Search
CPC ....................... G03G 15/0233; G03G 15/0818
See application file for complete search history.

(56) References Cited

U.S. PATENT DOCUMENTS 10,353,317 B1 * 7/2019 Wu .................... G03G 15/0233

FOREIGN PATENT DOCUMENTS

| | | | |
|---|---|---|---|
| JP | 2002-296877 | A | 10/2002 |
| JP | 2007-232861 | A | 9/2007 |
| JP | 2019-191519 | A | 10/2019 |
| JP | 2019-219498 | A | 12/2019 |
| JP | 2020-060749 | A | 4/2020 |

OTHER PUBLICATIONS

International Search Report of the ISA issued in PCT/JP2022/023970, mailed Jul. 26, 2022; ISA/JP. (4 pages).
Extended European Search Report for corresponding European Patent Application No. 22858151.8 dated Oct. 29, 2025 (8 Pages).

* cited by examiner

*Primary Examiner* — Joseph S Wong
(74) *Attorney, Agent, or Firm* — Harness, Dickey & Pierce, P.L.C.

(57) ABSTRACT

A charge roller includes a base and a surface layer formed on an outer peripheral surface of the base, with a contact angle between the surface layer and toluene being 6° or more, and a contact angle between the surface layer and tetradecane being 22° or more.

10 Claims, 2 Drawing Sheets

IMAGE-FORMING ROLLER, CHARGE ROLLER, METHOD FOR INSPECTING IMAGE-FORMING ROLLER, AND METHOD FOR INSPECTING CHARGE ROLLER

CROSS REFERENCE TO RELATED APPLICATIONS

This application is a U.S. National Phase Application under 35 U.S.C. 371 of International Application No. PCT/JP2022/023970, filed on Jun. 15, 2022, which claims priority to Japanese Patent Application No. 2021-132842, filed on Aug. 17, 2021. The entire disclosures of the above applications are expressly incorporated by reference herein.

TECHNICAL FIELD

This invention relates to an image-forming roll used for electrophotographic image formation, for example, to a charge roller.

BACKGROUND ART

In an electrophotographic image-forming apparatus, a roller member such as an electrically charged roller or a developer roller is arranged around a photoconductor. For example, Japanese Patent Application Laid-Open Publication No. 2019-191519 discloses a configuration in which a surface roughness of a conductive roller such as the electrically charged roller is optimized. Japanese Patent Application Laid-Open Publication No. 2019-219498 discloses a configuration in which a surface layer of a conductive roller is formed from two types of particles that have different diameters.

Generally, an electrophotographic image-forming apparatus is configured to have a cleaning blade that removes toner adhering to a surface of a roller member such as an electrically charged roller. In practice, however, toner components that cannot be completely removed by the cleaning blade may remain as a thin film (toner filming) over a wide area of the surface of the roller member. Given these circumstances, an object of one aspect of this invention is to reduce adhesion of toner components to a surface of an image-forming roller.

SUMMARY

An image-forming roller according to one embodiment of the present invention comprises a roller core and a surface layer formed on an outer peripheral surface of the roller core, and a contact angle between the surface layer and toluene is 6° or more, and a contact angle between the surface layer and tetradecane is 22° or more. In a more specific embodiment, the contact angle between the surface layer and toluene is 13° or more, and the contact angle between the surface layer and tetradecane is 25° or more. In another embodiment, the surface layer contains a material that includes a silicon-based urethane resin.

A charge roller according to another embodiment of the present invention is used for an electrophotographic apparatus and comprises a body and a surface layer formed on an outer peripheral surface of the body, and a contact angle between the surface layer and toluene is 6° or more, and a contact angle between the surface layer and tetradecane is 22° or more. In a more specific embodiment, the contact angle between the surface layer and toluene is 13° or more, and the contact angle between the surface layer and tetradecane is 25° or more.

A method for inspecting an image-forming roller according to one embodiment of the invention that includes a body and a surface layer formed on an outer circumferential surface of the body, to determine whether the image-forming roller is in good condition or not in good condition, the method comprising determining that the image-forming roller is in good condition when a contact angle between the surface layer and toluene is 6° or more, and when a contact angle between the surface layer and tetradecane is 22° or more. In a more specific embodiment, the image-forming roller is determined to be in good condition when the contact angle between the surface layer and toluene is 13° or more, and when the contact angle between the surface layer and tetradecane is 25° or more.

A method for inspecting a charge roller according to another embodiment of the present invention that includes a base and a surface layer formed on an outer circumferential surface of the base, to determine whether the charge roller is in good condition or not in good condition, the method comprising determining that the charge roller is in good condition when a contact angle between the surface layer and toluene is 6° or more, and when a contact angle between the surface layer and tetradecane is 22° or more. In a more specific embodiment, the charge roller is determined to be in good condition when the contact angle between the surface layer and toluene is 13° or more, and when the contact angle between the surface layer and tetradecane is 25° or more.

Effects of the Invention

According to the present invention, adhesion of toner components to the surface of the image-forming roller can be reduced.

DETAILED DESCRIPTION

A: Image-Forming Apparatus

Figure 1:
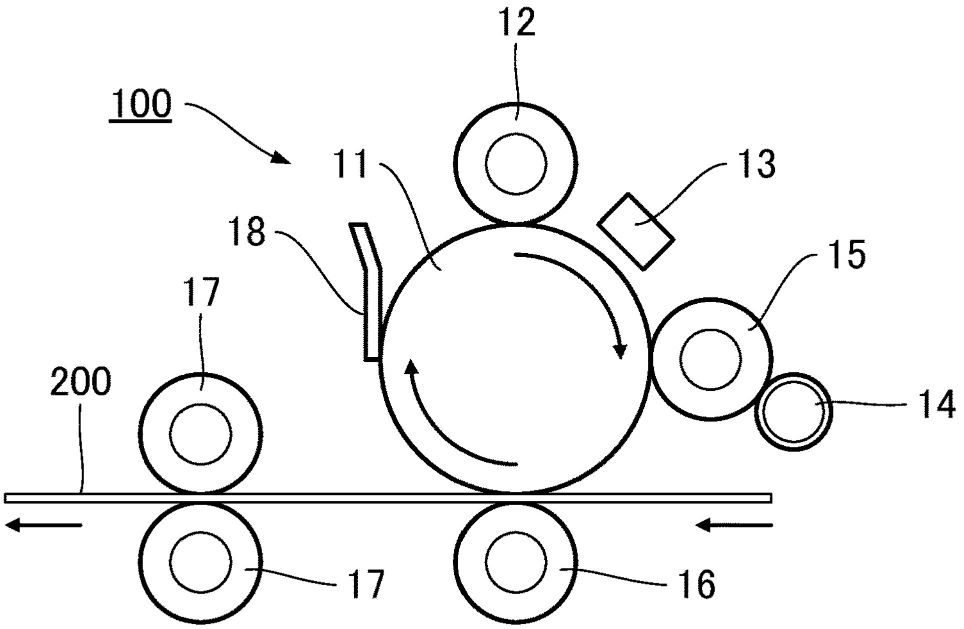
FIG. 1 is a diagram showing a configuration of an image-forming apparatus according to an embodiment.

FIG. 1 is a diagram showing an image-forming apparatus 100 according to one configuration of the present invention. The image-forming apparatus is an electrophotographic printing apparatus (for example, a multi-function printer) that forms images on a sheet-like recording medium 200 such as printing paper. The image-forming apparatus 100 includes a photoconductor drum 11, a charge roller 12, an exposure device 13, a supply roller 14, a developing roller 15, a transfer roller 16, a pair of fusing rollers 17, and a cleaning blade 18. The charge roller 12, the supply roller 14, the developing roller 15, the transfer roller 16, and the fusing rollers 17 are cylindrical roller members (image-forming rollers) used for forming electrophotographic images.

The charge roller 12 is a conductive roller that uniformly charges the surface of the photoconductor drum 11. The exposure device 13 forms an electrostatic latent image on the photoconductor drum 11 by exposing light to the surface of the drum. The supply roller 14 supplies charged toner to the surface of the developing roller 15. The developing roller 15 attaches the toner to the electrostatic latent image on the surface of the 15 photoconductor drum 11. The transfer roller 16 transfers the toner attached to the surface of the photoconductor drum 11 to the recording medium 200. The pair of fusing rollers 17 fixes the transferred toner to the surface of the recording medium 200. The cleaning blade 18 removes toner remaining on the surface of the photoconductor drum 11.

B: Charge Roller 12

Figure 2:
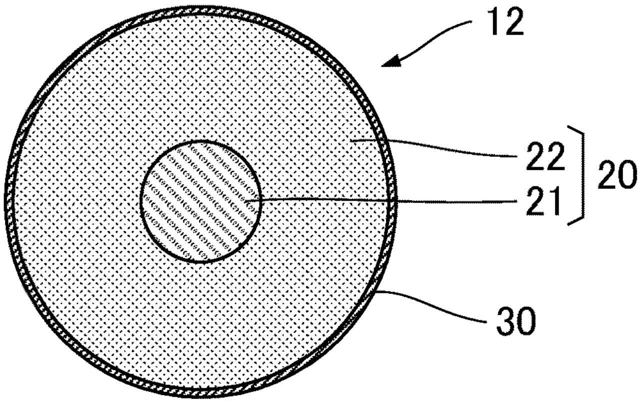
FIG. 2 is a cross-sectional view of a charge roller.

FIG. 2 is a cross-sectional view of the charge roller. As shown in FIG. 2, the charge roller 12 is a cylindrical roller member that has a roller core 20 and a surface layer 30. The roller core 20 has a core member 21 and an elastic member 22. The core member 21 is a cylindrical member and constitutes a rotation of axis of the charge roller 12. The core member 21 is formed from a metal material such as a SUS alloy or a resin material such as polyimide, for example.

The elastic member 22 is a cylindrical portion that is formed on an outer peripheral surface of the core member 21. The elastic member 22 is formed from a conductive elastic material. Examples of materials for the elastic member 22 include various rubber materials such as polyurethane rubber (PUR), epichlorohydrin rubber (ECO), nitrile rubber (NBR), styrene rubber (SBR), chloroprene rubber (CR), etc. Another layer such as an adhesion layer that improves adhesion between the outer peripheral surface of the core member 21 and the inner peripheral surface of the elastic member 22 may be formed between the outer peripheral surface of the core member 21 and the inner peripheral surface of the elastic member 22.

The surface layer 30 is a membrane formed on the outer peripheral surface of the roller core 20. Specifically, the surface layer 30 is formed over the entire area of the outer peripheral surface of the elastic member 22 with a substantially uniform thickness. The thickness of the surface layer 30 may be freely selected, and is, for example, equal to or greater than 2 μm and equal to or smaller than 40 μm. The outer peripheral surface of the surface layer 30 comprises the surface of the charge roller 12. As described below, the surface layer 30 includes a base material that includes a silicon-based urethane resin.

C: Method of Manufacture of the Charge Roller 12

Description will now be given of a method of manufacture of the charge roller 12. However, the method of manufacture of the charge roller 12 is not limited to the following examples.

First, the roller core 20 of the charge roller 12 is prepared. The elastic member 22 of the roller core 20 is formed, for example, of vulcanized epichlorohydrin rubber (ECO) with a hardness of 50° to 64°. The surface roughness of the outer peripheral surface of the elastic member 22 (maximum height Rz conformed to JIS 82) is 3 μm. Mechanical polishing is performed on the roller core 20. The mechanical polishing includes dry polishing and wet polishing. Dry polishing is mechanical polishing using grindstones; while wet polishing is mechanical polishing using waterproof sandpapers. The wet polishing may be omitted.

The surface layer 30 is formed on the outer peripheral surface of the roller core 20. More specifically, a coating liquid of a predetermined composition is agitated by utilizing, for example, ultrasonic waves, and is coated on the outer peripheral surface of the roller core 20. The coating method used for the coating liquid may be freely selected. For example, a spray coating method is appropriate. The surface layer 30 is then fired by utilizing, for example, an electric furnace. The electric furnace is set to a temperature of 80° C. or higher and 160° C. or lower, for example. The firing time is set to an appropriate time of not less than 20 minutes and not more than 60 minutes.

D: Study of the Properties of the Surface Layer 30

In a configuration where the surface layer 30 of the charge roller 12 and the components contained in the toner (hereinafter referred to as "toner components") have a high affinity, residual toner components remaining on the surface of the photoconductor drum 11 after use of the cleaning blade 18 are likely to remain as a thin film over a wide area of the surface of the charge roller 12. When residual toner components remain on the surface of the charge roller 12 (toner filming), errors can occur in design values for a size of a nip at which the photoconductor drum 11 and the charge roller 12 are in contact with each other, or in a clearance between the photoconductor drum 11 and the charge roller 12 around the nip. As a result, efficiency of discharge from the charge roller 12 to the photoconductor drum 11 may decrease, thereby causing a decrease in image quality. Accordingly, it is important to reduce an affinity between the surface layer 30 of the charge roller 12 and the toner components. In view of these circumstances, the inventors of the present invention have considered reducing wettability of the surface layer 30 of the charge roller 12 relative to the toner components.

Figure 3:
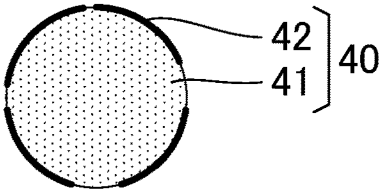
FIG. 3 is a cross-sectional view of a toner particle.

FIG. 3 is a cross-sectional view of a toner particle 40 of this embodiment. As shown in FIG. 3, the toner particle 40 includes a spherical toner core 41 and a shell layer 42 formed on the surface of the toner core 41. The shell layer 42 entirely or partially covers the surface of the toner core 41.

The toner core 41 contains additives such as wax, for example, in addition to color materials such as pigments. The wax is composed of a material containing aliphatic hydrocarbons as a major component, for example. The shell layer 42 is composed of a material containing styrene-acrylic resin as a major component, for example. In view of these circumstances, the inventors of the present invention envisaged aliphatic hydrocarbons and styrene-acrylic resin as toner components that could adhere to the surface layer 30 of the charge roller 12.

The aliphatic hydrocarbons contained in the wax of the toner core 41 are characterized by their large hydrocarbon content. On the other hand, the styrene-acrylic resin contained in the shell layer 42 is classified as an aromatic hydrocarbon. With a view to reducing the wettability of the toner components relative to the surface layer 30 of the charge roller 12, the inventors took into consideration the characteristics of the wax with a large hydrocarbon content and the characteristics of the shell layer 42, which is the aromatic hydrocarbon, and selected from among several resin materials a silicon-based urethane resin for use as a base material of the surface layer 30 of the charge roller 12.

A carbonate urethane resin was also considered as a candidate material for the surface layer 30 of the charge roller 12. However, the carbonate urethane resin has a large hydrocarbon content similarly to the wax, and is classified as an aromatic hydrocarbon similarly to the shell layer 42. Therefore, it was assumed that the carbonate urethane resin would have a high affinity with the toner components. In contrast, the silicon-based urethane resin has a small hydrocarbon content and contains no aromatic hydrocarbon. Therefore, with a view to reducing the wettability of the toner components, the silicon-based urethane resin was deemed appropriate for use as a material of the surface layer 30 of the charge roller 12.

Tetradecane, which has a large hydrocarbon content similarly to the wax (aliphatic hydrocarbon), was envisaged as a solvent for the wax. Toluene, which is classified as an aromatic hydrocarbon similarly to the shell layer 42 (styrene-acrylic resin), was envisaged as the solvent for the shell layer 42. Accordingly, when envisaging tetradecane and toluene as the toner solvents, consideration was given to the wettability (contact angle) between the toner solvents and the surface layer 30 of the charge roller 12.

Table 1 below is a chart showing results of evaluating the contact angle between the surface layer 30 and tetradecane, the contact angle between the surface layer 30 and toluene, and the presence of toner filming for each of several samples (Example 1, Example 2, and Comparative example) with different conditions for the surface layer 30 of the charge roller 12.

Table 1 also includes the results of evaluation of occurrence of a thin-film-like solvent (toner filming) on the surface of the charge roller 12. Specifically, a visual check for occurrence of toner filming on the surface of the charge roller 12 was carried out after printing the same image on a total of 10,000 sheets of printing paper using the image-forming apparatus 100.

Example 1 and Example 2 comprise samples in which the surface layer 30 of the charge roller 12 was formed from a base material containing a silicone urethane resin. On the other hand, the comparative example comprises a sample in which the surface layer 30 of the charge roller 12 is formed from a base material containing a carbonate urethane resin. Table 2 is a chart showing the composition of the coating liquid used for forming the surface layer 30. As will be understood from Table 2, the composition in Example 1 and the composition in Example 2 differ from each other.

TABLE 2

| FUNCTION | MATERIAL | MATERIAL DETAIL | PROPORTION (PARTS BY WEIGHT) EXAMPLE 1 | EXAMPLE 2 | COMPARATIVE EXAMPLE |
|---|---|---|---|---|---|
| DILUTING SOLVENT | ETHYL ACETATE | | 49.2 | 32.6 | 29.6 |
| BASE MATERIAL | POLYOL | SHIN-ETSU CHEMICAL X22-160AS | 8.5 | 5.1 | — |
| | | ASAHI CHEMICAL INDUSTRY DURANOL ™ T5650E | — | — | 3.3 |
| | CURING AGENT | ASAHI CHEMICAL INDUSTRY DURANATE ™ E402-80B | 12.0 | 9.3 | 18.5 |
| CONDUCTIVE AGENT | CARBON DISPERSION | MIKUNI-COLOR MHI-BK (CARBON CONTENT 20-30 wt %) | 28.1 | 48.3 | 43.9 |
| ADDITIVE | ACRYLIC SILICON POLYMER | NIPPON OIL & FATS MODIPER ® FS700 | 1.1 | 3.5 | 3.5 |
| SURFACE ROUGHNESS ADDITIVE | URETHANE PARTICLE | NEGAMI CHEMICAL INDUSTRIAL ART PEARL ® C800 | 1.1 | 1.2 | 1.2 |

TABLE 1

| | | EXAMPLE 1 | EXAMPLE 2 | COMPARATIVE EXAMPLE |
|---|---|---|---|---|
| SURFACE LAYER 30 BASE MATERIAL | | SILICON-BASED URETHANE RESIN | SILICON-BASED URETHANE RESIN | CARBONATE URETHANE RESIN |
| CONTACT ANGLE [°] | TOLUENE [SHELL LAYER] | 13 | 6 | 2 |
| | TETRA-DECANE [WAX] | 25 | 22 | 17 |
| TONER FILMING | | NO | NO | YES |

The contact angle) (°) in Table 1 is an index of the wettability of the solvent to the surface layer 30 of the charge roller 12. For example, each contact angle in Table 1 was measured by a contact angle droplet method to analyze a shape of a droplet of solvent dripped onto the surface of the surface layer 30. Specifically, the contact angle was calculated by observing the droplet when 10 seconds had elapsed from dripping 0.1-μL of solvent onto the surface of the surface layer 30.

As is apparent from Table 1, in the comparative example, the contact angle between the surface layer 30 and toluene is 2°, and the contact angle between the surface layer 30 and tetradecane is 17°. In the comparative example, the base material of the surface layer 30 of the charge roller 12 contains carbonate urethane resin. Due to the small contact angle (high wettability) as described above, occurrence of toner filming was observed.

On the other hand, as is apparent from Table 1, in Example 1, the contact angle between the surface layer 30 and toluene is 13° and the contact angle between the surface layer 30 and tetradecane is 25°. In Example 1, the base material of the surface layer 30 of the charge roller 12 contains silicon-based urethane resin. In Example 1, occurrence of toner filming was not observed. In Example 2 in which the base material of the surface layer 30 contains silicon-based urethane resin, the contact angle of the surface layer 30 and toluene is 6° and the contact angle to tetradecane is 22°. In Example 2, occurrence of toner filming was also not observed.

As will be understood from the above results, from a viewpoint of preventing occurrence of toner filming on the surface of the charge roller 12, a configuration (Example 2)

in which the contact angle of the surface of the charge roller 12 and toluene is 6° or more and the contact angle of the surface of the charge roller 12 and tetradecane is 22° or more is appropriate. Even more appropriate is a configuration (Example 1) in which the contact angle of the surface of the charge roller 12 and toluene is 13° or more and the contact angle of the surface of the charge roller 12 and tetradecane is 25° or more.

As explained above, according to this embodiment, an affinity of the toner components to the surface layer 30 of the charge roller 12 is reduced, thereby resulting in prevention of occurrence of toner filming on the surface layer 30. According to the above configuration, errors in the size of the nip at which the photoconductor drum 11 and the charge roller 12 are in contact with each other, or in the clearance between the photoconductor drum 11 and the charge roller 12 around the nip, are reduced. Therefore, a decrease in discharge efficiency from the charge roller 12 to the photoconductor drum 11 is reduced, and as a result, high-quality images are formed by the image-forming apparatus 100.

E: Inspection of Charge Roller 12

Figure 4:
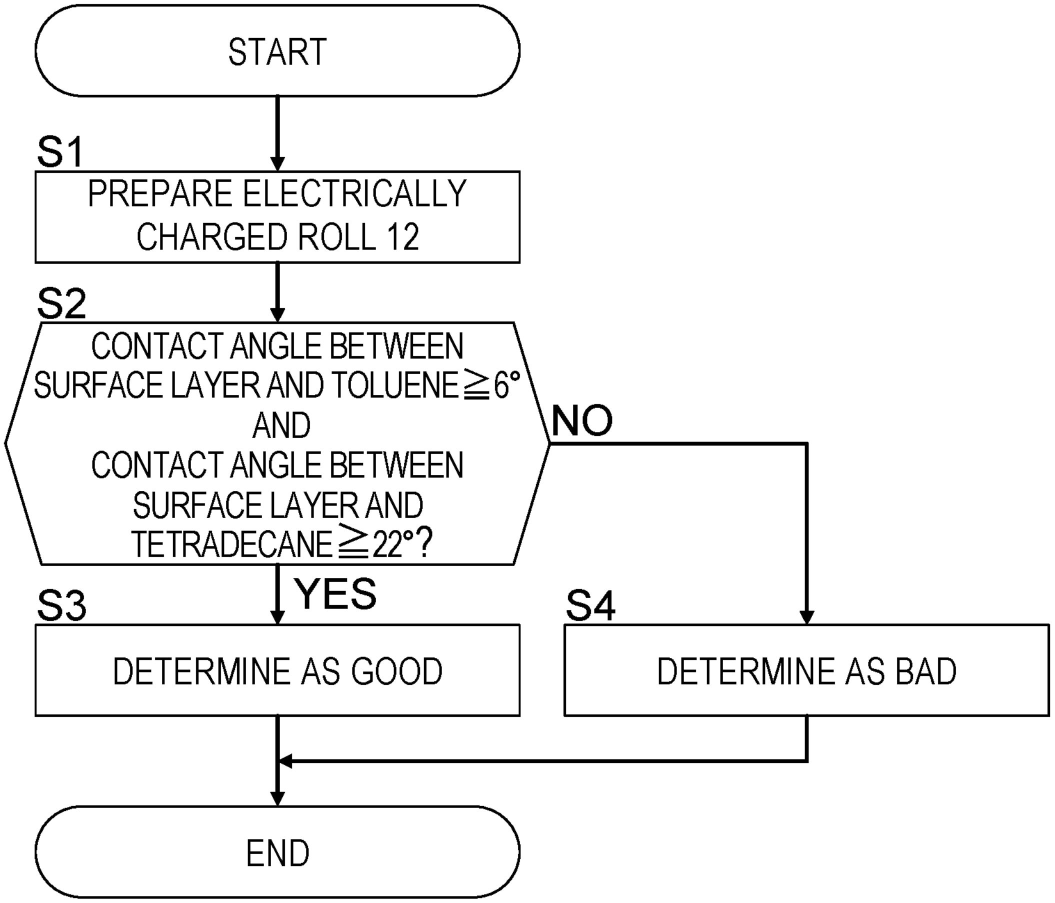
FIG. 4 shows a flowchart used for inspection of the charge roller.

FIG. 4 is a flow chart showing an inspection process for determining whether the charge roller 12 is in good condition or is not in good condition. The inspection process shown in FIG. 4 is performed after manufacture of the charge roller 12 using the method of manufacture described above. The method of manufacture of the charge roller 12 may include the inspection process shown in FIG. 4.

First, the charge roller 12 to be inspected is prepared (process S1). After process S1 is carried out, in process S2 it is determined whether both a first condition and a second condition are satisfied. The first condition is that the contact angle between the surface layer 30 of the charge roller 12 and toluene is 6° or more, and the second condition is that the contact angle between the surface layer 30 of the charge roller 12 and tetradecane is 22° or more. It is determined that the charge roller 12 is in good condition (process S3) when both the first condition and the second condition are satisfied (S2: YES). On the other hand, it is determined that the charge roller 12 is not in good condition (process S4) when at least one of the first condition or the second condition is not satisfied (S2: NO).

As explained above, in the inspection process, it is determined that the charge roller 12 is in good condition when the contact angle between the surface layer 30 thereof and toluene is 6° or more and when the contact angle between the surface layer 30 thereof and tetradecane is 22° or more. As described above, toner filming on the surface layer 30 of the charge roller 12 is prevented when the above conditions are satisfied. Therefore, it is possible to provide a charge roller 12 that can maintain the quality of images formed by the image-forming apparatus 100 at a high level.

In the above description, an example is given of a first condition where the contact angle between the surface layer 30 of the charge roller 12 and toluene is 6° or more, and a second condition where the contact angle between the surface layer 30 of the charge roller 12 and tetradecane is 22° or more. Also assumed is a configuration in which in the first condition the contact angle between the surface layer 30 of the charge roller 12 and toluene is 13° or more and in which in the second condition the contact angle between the surface layer 30 of the charge roller 12 and tetradecane is 25° or more. In other words, it may be determined that the charge roller 12 is in good condition when the contact angle between the surface layer 30 of the charge roller 12 and toluene is 13° or more and the contact angle between the surface layer 30 of the charge roller 12 and tetradecane is 25° or more.

F: Modifications

Examples of modifications of each embodiment described above are exemplified below. Two or more forms freely selected from the following examples may be combined as appropriate in so far as they do not contradict each other.

(1) The material of the surface layer 30 of the charge roller 12 is not limited to a silicon-based urethane resin. In other words, any material may be used for forming the surface layer 30, if the contact angle between the surface layer 30 of the charge roller 12 and toluene is 6° or more and the contact angle between the surface layer 30 of the charge roller 12 and tetradecane is 22° or more, or more preferably, the contact angle between the surface layer 30 of the charge roller 12 and toluene is 13° or more and the contact angle between the surface layer 30 of the charge roller 12 and tetradecane is 25° or more.

(2) In the above-described embodiment, an example is given of a configuration in which the roller core 20 comprises the core member 21 and the elastic member 22. However, the roller core 20 is not limited to the above example. For example, the roller core 20 may comprise a single cylindrical element. Thus, in this invention the distinction between the core member 21 and the elastic member 22 is not essential. Another layer, such as an adhesion layer that improves adhesion of the surface layer 30, may be formed on an outermost layer of the roller core 20. In other words, another layer may be interposed between the elastic member 22 and the surface layer 30.

(3) In the above-described embodiment, an example is given of a configuration in which the present invention is applied to the charge roller 12. However, the scope of application of this invention is not limited to the charge roller 12. For example, this invention may be applied to any roller member (image-forming roller) used for electrophotographic image forming. More specifically, in addition to the charge roller 12 explained in the above-described embodiment, the present invention may be similarly applied to each of the elements exemplified in FIG. 1 (the supply roller 14, developer roller 15, transfer roller 16, and fusing roller 17).

In the above-described embodiment, an example is given of the inspection process (FIG. 4) of the charge roller 12. However, the same inspection process may be applied to any image-forming roller other than the charge roller 12. In other words, for example, if the contact angle between the surface layer of an image-forming roller and toluene is 6° or more and the contact angle between the surface layer of the image-forming roller and tetradecane is 22° or more, the image-forming roller is determined to be in good condition. The image-forming roller may be determined to be in good condition when the contact angle between the surface layer of an image-forming roller and toluene is 13° or more and when the contact angle between the surface layer of the image-forming roller and tetradecane is 25° or more.

The invention claimed is:

1. An image-forming roller comprising:

a roller core; and a surface layer formed on an outer peripheral surface of the roller core, wherein a material of the surface layer includes a surface roughness additive, a contact angle between the surface layer and toluene is 6° or more, and a contact angle between the surface layer and tetradecane is 22° or more.

2. The image-forming roller according to claim 1, wherein the contact angle between the surface layer and toluene is 13° or more, and the contact angle between the surface layer and tetradecane is 25° or more.

3. The image-forming roller according to claim 1, wherein the surface layer contains a base material that includes a silicon-based urethane resin.

4. A charge roller used for an electrophotographic apparatus comprising:

a body; and a surface layer formed on an outer peripheral surface of the body, wherein a material of the surface layer includes a surface roughness additive, a contact angle between the surface layer and toluene is 6° or more, and a contact angle between the surface layer and tetradecane is 22° or more.

5. The charge roller according to claim 4, wherein the contact angle between the surface layer and toluene is 13° or more, and the contact angle between the surface layer and tetradecane is 25° or more.

6. A method for inspecting an image-forming roller that includes a body and a surface layer formed on an outer circumferential surface of the body, to determine whether the image-forming roller is in good condition or not in good condition, the method comprising:

determining that the image-forming roller is in good condition when a contact angle between the surface layer and toluene is 6° or more and when a contact angle between the surface layer and tetradecane is 22° or more.

7. The method for inspecting an image-forming roller according to claim 6, wherein the image-forming roller is determined to be in good condition when the contact angle between the surface layer and toluene is 13° or more and when the contact angle between the surface layer and tetradecane is 25° or more.

8. A method for inspecting a charge roller that includes a base and a surface layer formed on an outer circumferential surface of the base, to determine whether the charge roller is in good condition or not in good condition, the method comprising:

determining that the charge roller is in good condition when a contact angle between the surface layer and toluene is 6° or more, and when a contact angle between the surface layer and tetradecane is 22° or more.

9. The method for inspecting a charge roller according to claim 8, wherein the charge roller is determined to be in good condition when the contact angle between the surface layer and toluene is 13° or more, and when the contact angle between the surface layer and tetradecane is 25° or more.

10. The image-forming roller according to claim 1, wherein a film thickness of the surface layer is greater than 2 μm and less than or equal to 40 μm.

* * * * *